April 28, 1925.
H. F. LOEWER
MACHINE FOR TURNING IRREGULAR OBJECTS
Filed Aug. 8, 1923 2 Sheets-Sheet 1
1,535,673
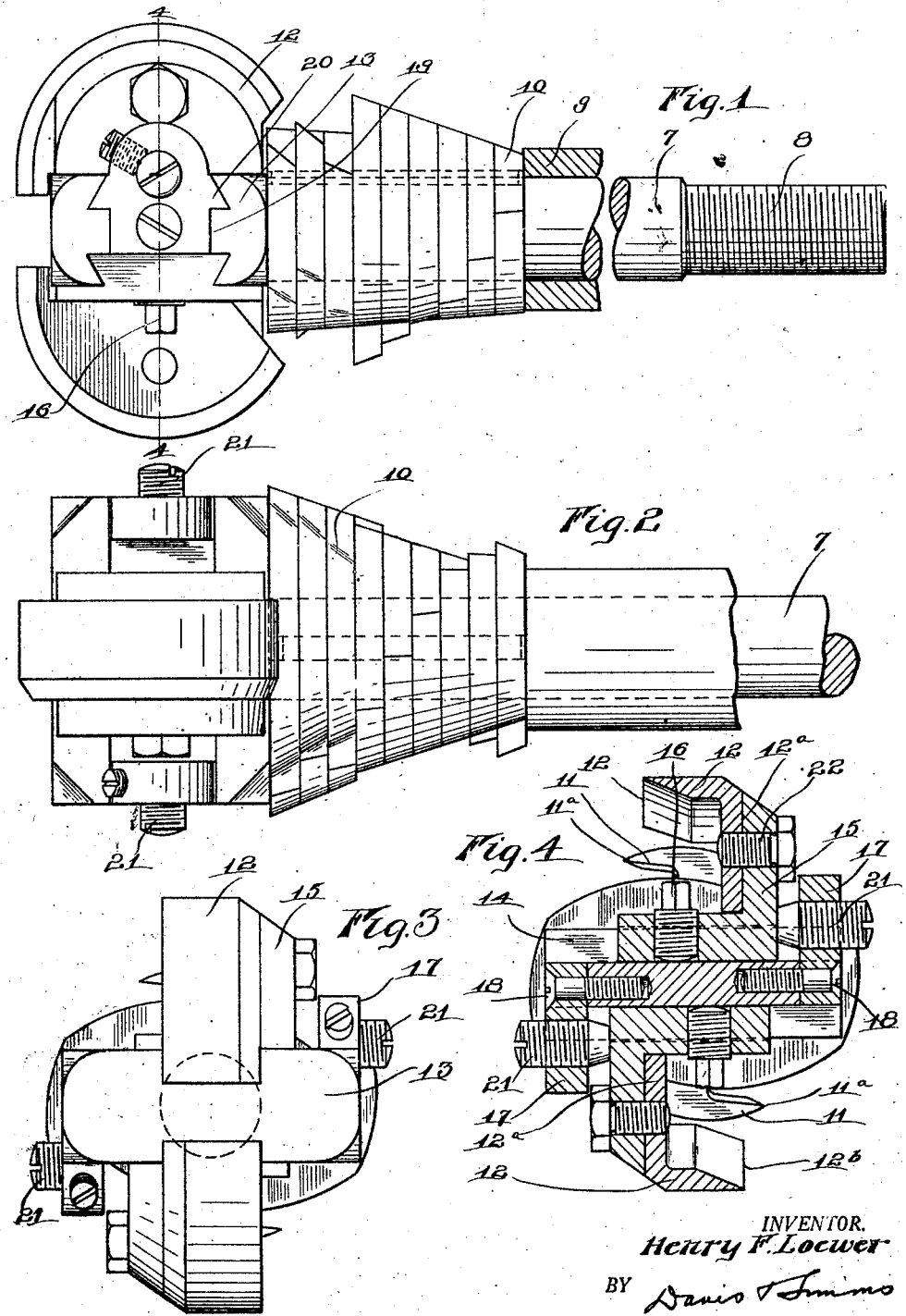

April 28, 1925.
H. F. LOEWER
1,535,673
MACHINE FOR TURNING IRREGULAR OBJECTS
Filed Aug. 8, 1923     2 Sheets-Sheet 2
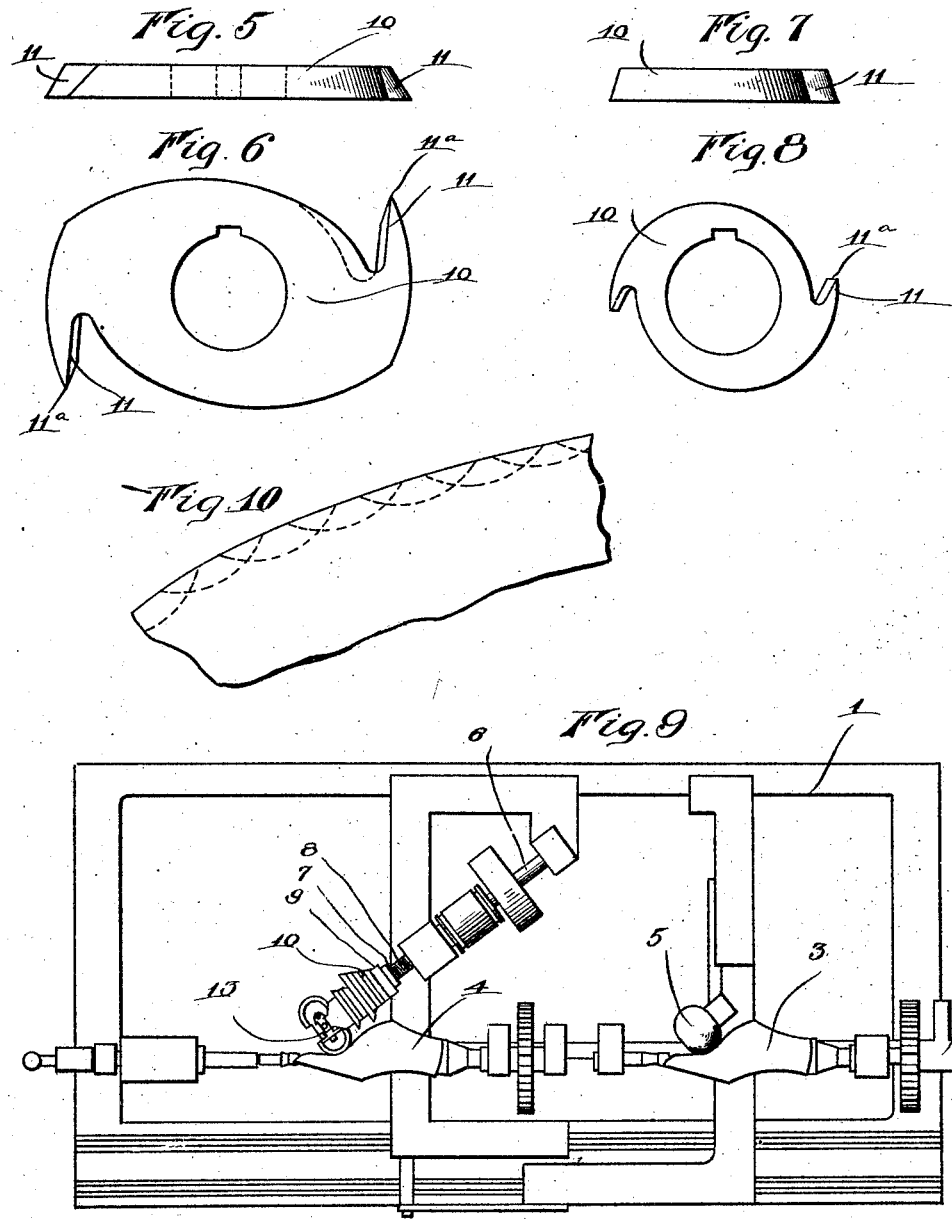
INVENTOR.
Henry F. Loewer:
BY Davis & Simms
his ATTORNEYS.

Patented Apr. 28, 1925.

1,535,673

UNITED STATES PATENT OFFICE.

HENRY F. LOEWER, OF ROCHESTER, NEW YORK.

MACHINE FOR TURNING IRREGULAR OBJECTS.

Application filed August 8, 1923. Serial No. 656,321.

*To all whom it may concern:*

Be it known that I, HENRY F. LOEWER, a citizen of the United States, and resident of Rochester, in the county of Monroe and State of New York, have invented certain new and useful Improvements in Machines for Turning Irregular Objects, of which the following is a specification.

The present invention relates to machines for turning irregular objects, and an object thereof is to provide a machine in which the cutting tool shapes the work piece in accordance with a model, so that the grinding or finishing operations on the work piece following the cutting operation are reduced to a minimum and an article is obtained which closely approximates the model. Another object of the invention is to provide a cutter which forms a wide groove in the work piece so that by overlapping the grooves an article is obtained substantially free from ridges, thus reducing the finishing operations on the article to a minimum.

To these and other ends, the invention consists of certain parts and combinations of parts, all of which will be hereinafter described; the novel features being pointed out in the appended claims.

In the drawings:—

Fig. 1 is a side view partially in section of a cutting tool employed in the present invention;

Fig. 2 is a side view at right angles to that shown in Fig. 1;

Fig. 3 is an end view;

Fig. 4 is a section on the line 4—4, Fig. 1;

Fig. 5 is an edge view of one of the cutting rings;

Fig. 6 is a side view of the same ring;

Fig. 7 is an edge view of another cutting ring;

Fig. 8 is a side view of the same ring;

Fig. 9 is a plan view of a lathe or machine for turning lasts, parts of the machine being removed; and Fig. 10 is a detail view of a fragment of a last showing the manner in which successive cutting operations take place.

In this machine 1 indicates the main frame and the swinging frame 2 which carries the model 3 and the work piece 4, the model cooperating with a follower 5 and the work piece being engaged by the cutting tool which is supported on a shaft 6 turned about an axis at an angle other than a right angle to the axis of turning of the work piece 4. The general construction of this machine is old and well-known in last turning lathes and will not be further described in detail.

The feature of this invention relates more particularly to the construction of the cutting tool in which 7 indicates the shaft of the cutter having a screw threaded portion 8 at one end detachably engaged with the shaft 6. The shaft 7 is in turn surrounded by a nut 9 abutting at one end a series of ring cutters 10. These ring cutters as shown in Figs. 5 to 8, inclusive, have two diametrically arranged cutting projections 11, the cutting edges 11$^a$ of each projection being arranged at an oblique angle to the axis of the ring, the projections on adjacent rings being out of line and projecting farther from the center of the tool than those on the ring next to it on the side away from the free end of the tool.

At the free end of the tool, a plurality of arc shaped cutters 12 are provided. These cutters are supported on a head 13 in the form of an enlargement integral with the shaft 7 at the free end of the latter. This head has, in this instance, two sides, each provided with an undercut guideway 14 in which a slide 15 is adjustable, such slide being held in its adjusted position by a screw 16 which passes through the slide 15 and engages the bottom of the undercut guideway 14. At the ends of the guideways 14 two abutment blocks 17 are secured by screws 18, the head being recessed at 19 so that the blocks may be held in the recesses and the blocks having bevelled projections 20 on opposite sides projecting in abutment with the sides of undercut guideway 14 as shown in Fig. 1. The blocks 17 project in opposite directions one in the guideway 14 on one side of the head and the other in the guideway 14$^1$ on the opposite side of the head. Abutment screws 21 are adjustable in the abutment blocks 17 and cooperate with the slides 15 to remove the strain from the securing screw 16.

Each knife holding slide 15 carries one of the arcuate knives 12 which has a flange 12$^a$ abutting the slide 15 and secured thereto by a screw 22. The cutting edge 12$^b$ of each knife is a segment of a circle except that the forward end of the tool where it is projected at a short distance tangentially to the segmental circular portion. The center of this circle is so positioned, that, if the circle were continued, it would intersect the center of the rotation of the tool, or in other words the center of the cutting edge is nearer to the center of rotation of the tool than to the cutting edge, thus making it possible to provide an arcuate cutting edge which will make a wide groove in the work piece. As the groove is wide it is possible to overlap the grooves cut in the work piece as shown in Fig. 10 and in this way practically to eliminate any ridges on the finished article, thus making it possible to sand-paper the article or last without any extended grinding operation to remove the ridges and, at the same time, enabling the finished article or last to be practically a duplicate of the model. As the plane of each cutter may be shifted transversely of the axis of rotation of the cutting tool, it is possible to increase or decrease the depth of the cut.

It will be noted that the centers of the arcs of the arc shaped cutters extend transversely of the axis of rotation of the cutting tool and that the distance between the center of each of the cutting edges or in other words the radius of the arc shaped cutting edge is greater than the distance between the center of an arc shaped edge and the axis of rotation of the tool, thus making it possible to provide a tool of reduced diameter and, at the same time, obtain cutting edges, which will provide wide grooves in the work piece. It will also be noted that the inner ends of these arc shaped cutting edges if extended would intersect the plane of the adjacent ring cutter and in fact do extend into such plane between the cutting projections of the latter, so that there is no gap between the arc shaped cutters and the ring cutter. Furthermore, the tangential projection of the ends of the arc shaped cutters at the end of the tool makes it possible to cut at the extreme end of the tool, so that a tool is obtained which closely approximates the model follower.

The advantage of adjusting the cutters transversely of the axis of the tool is that it is possible at all times to cause the cutting edges to lie in the desired relation to the axis, notwithstanding the fact that the cutters may be worn down through sharpening which, when the cutters are not adjustable, tend to reduce the accuracy of the cutting tool. When adjustable in this way the cutters can be made to conform to the follower or guide wheel even after an extreme sharpening of the cutters, as not only the diameter of the tool as a whole is maintained, but the radius of the different cutters is maintained.

What I claim as my invention and desire to secure by Letters Patent is:—

1. A machine for turning irregular objects having a rotary cutting tool with an arc shaped cutting edge, the radius of which is of greater length than the distance between the center of the arc and the center of the axis of rotation of the tool and means permitting the adjustment of the cutters on lines extending transversely of the axis of rotation of the tool.

2. A machine for turning irregular objects having a rotary cutting tool formed with two arc shaped cutting edges on opposite sides of the axis thereof, the centers of the arcs of the two cutters extending transversely of the axis of rotation of the tool and the difference between the center of each arc and the axis of rotation being less than the radius of the arc and means permitting the adjustment of the cutters on lines extending transversely of the axis of rotation of the tool.

3. A machine for turning irregular objects comprising a rotary cutting tool having a head formed with transversely extending guides on opposite sides and two arc shaped cutters adjustable on said guides on lines extending transversely of the axis of the tool and each having the center of the arc extending transversely of the axis of rotation of the tool.

4. A machine for turning irregular objects comprising a rotary cutting tool having two undercut guideways on opposite sides thereof, two cutter carriers adjustable on said guideways on lines extending transversely of the axis of rotation of the tool, and two cutters having arc shaped cutting edges, the center of each of which extends transversely of the axis of rotation of the tool.

5. A machine for turning irregular objects comprising a rotary cutting tool having two undercut guideways on opposite sides thereof, two cutter carriers adjustable on said guideways on lines extending transversely of the axis of the tool, and two cutters having arc shaped cutting edges, the center of each of which extends transversely of the axis of rotation of the tool and nearer to the center of rotation of the tool than the distance between said center and the arc shaped cutting edge of a cutter.

6. A machine for turning irregular objects comprising a cutting tool including a shaft, a series of cutter rings surrounding said shaft, each having two diametrically arranged cutting projections, each cutting projection having a cutting edge arranged at an angle to the projection of the ring and the projection on the adjacent rings being out of line and projecting farther from the center of the tool than those on the rings next to it on the side of the free end of the tool, and arc shaped cutters between the free end of the tool and the rings, the centers of said arc shaped cutters extending transversely of the axis of the tool.

7. A machine for turning irregular objects comprising a cutting tool including a shaft, a series of cutter rings surrounding said shaft, each having two diametrically arranged cutting projections, each cutting projection having a cutting edge arranged at an angle to the projection of the ring and the projection on the adjacent rings being out of line and projecting farther from the center of the tool than those on the rings next to it on the side of the free end of the tool, and arc shaped cutters between the free end of the tool and the rings, the centers of said arc shaped cutters extending transversely of the axis of the tool, the arcs being such that if extended they would intersect the plane of the ring cutter next the arc shaped cutters.

HENRY F. LOEWER.